(12) United States Patent
Song et al.

(10) Patent No.: US 11,670,769 B2
(45) Date of Patent: Jun. 6, 2023

(54) POWDEROUS LITHIUM COBALT-BASED OXIDE COMPOUND FOR RECHARGEABLE LITHIUM ION BATTERIES AND A METHOD FOR MAKING THEREOF

(71) Applicants: Umicore, Brussels (BE); Umicore Korea Ltd, Chungcheongnam-do (KR)

(72) Inventors: KyeongSe Song, Chungcheongnam-do (KR); Maxime Blangero, Chungcheongnam-do (KR)

(73) Assignees: UMICORE, Brussels (BE); UMICORE KOREA LTD., Chungcheongnam-do (KR)

( * ) Notice: Subject to any disclaimer, the term of this patent is extended or adjusted under 35 U.S.C. 154(b) by 311 days.

(21) Appl. No.: 16/931,501

(22) Filed: Jul. 17, 2020

(65) Prior Publication Data

US 2021/0028454 A1    Jan. 28, 2021

Related U.S. Application Data (60) Provisional application No. 62/877,364, filed on Jul. 23, 2019.

(30) Foreign Application Priority Data

Jul. 23, 2019  (WO) .................. PCT/IB2019/056282
Jul. 23, 2019  (WO) .................. PCT/IB2019/056284

(51) Int. Cl.
*H01M 4/525*  (2010.01)
*H01M 4/04*  (2006.01)
(Continued)

(52) U.S. Cl.
CPC ......... *H01M 4/525* (2013.01); *H01M 4/0471* (2013.01); *H01M 4/131* (2013.01);
(Continued)

(58) Field of Classification Search
None
See application file for complete search history.

(56) References Cited

U.S. PATENT DOCUMENTS

2010/0285366 A1   11/2010  Endoh
2012/0183858 A1   7/2012  Ellenwood et al.
(Continued)

FOREIGN PATENT DOCUMENTS

JP      2006302542 A    11/2006
JP      2010262826 A    11/2010
(Continued)

OTHER PUBLICATIONS

USPTO; Non-Final Office Action for U.S. Appl. No. 16/931,513 dated Oct. 6, 2022, 12 pages.
(Continued)

*Primary Examiner* — Carlos Barcena
(74) *Attorney, Agent, or Firm* — NK Patent Law (57) ABSTRACT

A lithium cobalt-based oxide cathode active material powder comprising particles having a median particle size D50 of greater than or equal to 20 µm, preferably 25 µm, and less than or equal to 45 µm, said particles having an averaged circularity of greater than or equal to 0.85 and less than or equal to 1.00, said particles having a general formula $Li_{1+a}Co_{1-x-y-z}Al_xM'_yMe_zO_2$, wherein M' and Me comprise at least one element of the group consisting of: Ni, Mn, Nb, Ti, W, Zr, and Mg, with $-0.01 \leq a \leq 0.01$, $0.002 \leq x \leq 0.050$, $0 \leq y \leq 0.020$ and $0 \leq z \leq 0.050$, said lithium cobalt-based oxide particles having a R-3m structure and (018) diffraction peak asymmetry factor $A_{D(018)}$ of greater than or equal to 0.85 and less than or equal to 1.15, said diffraction peak asymmetry factor being obtained by a synchrotron XRD spectrum analysis with an emission wavelength λ value equal to 0.825 Å.

14 Claims, 2 Drawing Sheets

(51) Int. Cl.
*H01M 4/131* (2010.01)
*H01M 4/36* (2006.01)
*H01M 4/505* (2010.01)
*H01M 10/0525* (2010.01)
*H01M 4/02* (2006.01)

(52) U.S. Cl.
CPC ........... *H01M 4/364* (2013.01); *H01M 4/505* (2013.01); *H01M 10/0525* (2013.01); *H01M 2004/021* (2013.01)

(56) References Cited

U.S. PATENT DOCUMENTS

| | | |
|---|---|---|
| 2014/0212759 A1 | 7/2014 | Blangero et al. |
| 2015/0093643 A1 | 4/2015 | Hiratsuka |
| 2019/0027782 A1 | 1/2019 | Tamura et al. |
| 2020/0335824 A1 | 10/2020 | Xia et al. |

FOREIGN PATENT DOCUMENTS

| | | |
|---|---|---|
| JP | 2013120734 A | 6/2013 |
| JP | 2017021941 A | 1/2017 |
| JP | 2018527718 A | 9/2018 |
| KR | 10-2014-0009526 A | 1/2014 |
| WO | 2009099156 A1 | 8/2009 |
| WO | 2017135414 A1 | 8/2017 |
| WO | 2018162165 A1 | 9/2018 |

OTHER PUBLICATIONS

USPTO; Non-Final Office Action for U.S. Appl. No. 16/931,513 dated Mar. 3, 2023, 14 pages.

POWDEROUS LITHIUM COBALT-BASED OXIDE COMPOUND FOR RECHARGEABLE LITHIUM ION BATTERIES AND A METHOD FOR MAKING THEREOF

CROSS REFERENCE TO RELATED APPLICATIONS

This application claims priority to U.S. Provisional Application No. 62/877,364, filed Jul. 23, 2019; International Application No. PCT/IB2019/056282, filed Jul. 23, 2019; and International Application No. PCT/IB2019/056284, filed Jul. 23, 2019. The entire contents of each are incorporated by reference herein.

TECHNICAL FIELD AND BACKGROUND

This invention relates to a lithium cobalt-based oxide (LCO) cathode active material powder for lithium-ion secondary batteries (LIBs) suitable for portable electronic device applications.

As the functionalities and performances of portable electronic devices are constantly improving, LIBs having a higher volumetric energy density are required.

The volumetric energy density of a cathode active material powder is obtained according to a following equation:

Volumetric energy density(mAh/cm$^3$)=volumetric capacity(mAh/cm$^3$)×Charge cutoff voltage (V), wherein:

$$\text{Volumetric capacity (mAh/cm}^3\text{)} = \frac{\text{Specific discharge capacity (mAh/g)}}{\text{Density of a cathode active material (g/cm}^3\text{)}}$$

A higher charge cutoff voltage (such as greater than or equal to 4.5V vs. Li$^+$/Li reference potential) leads to a significant increase of the volumetric energy density of a cathode material powder.

It is therefore an object of the present invention to provide a lithium cobalt-based oxide cathode active material powder for lithium-ion secondary batteries, having an improved volumetric capacity of at least 570 mAh/cm$^3$ obtained by the analytical methods of the present invention.

In addition to the improved volumetric capacity, the LCO cathode active material compound according to the present invention must have a sufficient structural stability at a voltage greater than or equal to 4.5V so far. Such a sufficient stability is indicated by a specific floating capacity of at most 80 mAh/g (obtained by the analytical methods of the present invention) during the use of the cathode active material powder in a LIB.

SUMMARY OF THE INVENTION

This objective is achieved by providing a lithium cobalt-based oxide cathode active material powder according to claim 1, which comprises particles having a median particle size D50 of greater than or equal to 20.00 μm, preferably 25.00 μm, and less than or equal to 45.00 μm, said particles having an averaged circularity of greater than or equal to 0.85 and less than or equal to 1.00, said particles having a general formula Li$_{1+a}$Co$_{1-x-y-z}$Al$_x$M'$_y$Me$_z$O$_2$, wherein M' and Me comprise at least one element of the group consisting of: Ni, Mn, Nb, Ti, W, Zr, and Mg, with −0.01≤a≤0.01, 0.002≤x≤0.050, 0≤y≤0.020 and 0≤z≤0.050, said lithium cobalt-based oxide particles having a R-3m structure and (018) diffraction peak asymmetry factor A$_{D(018)}$ of greater than or equal to 0.85 and less than or equal to 1.15, said diffraction peak asymmetry factor being obtained by a synchrotron XRD spectrum analysis with an emission wavelength λ value equal to 0.825 Å.

It is indeed observed that an improved volumetric capacity of higher than 570 mAh/cm$^3$ and a specific floating capacity of lower than 80 mAh/g, as illustrated in the results provided in Table 2, are achieved with a battery using a LCO cathode material powder according to EX1, having the following features:

a median particle size D50 of 38.00 μm, an averaged circularity of 0.87, and a peak asymmetry factor of the (018) diffraction peak (A$_{D(018)}$) of 0.88.

In the framework of the present invention, the peak asymmetry factor A$_{D(018)}$ indicates a degree of uniformity of elemental aluminum contained in the particles. An A$_{D(018)}$ value of 1.00 indicates that aluminum atoms are uniformly or homogenously distributed in the particles.

More particularly, A$_{D(018)}$=D2/D1, wherein:
1) D1 is a first 2θ angle difference (expressed in °) between:
    i) a first 2θ angle (A1) value (on the x axis) at which the (018) diffraction peak has its maximum intensity (I$_{MAX}$), and
    ii) a second 2θ angle (A2) value (on the x axis), less than the first 2θ angle (A1) value, at which the (018) diffraction peak has a first intensity (I$_{10\%}^1$) that is equal to 10% of the maximal intensity (I$_{MAX}$), i.e. I$_{10\%}^1$=0.1 I$_{MAX}$.
2) D2 is a second 2θ angle difference (expressed in °) between:
    i) the first 2θ angle (A1) value, and
    ii) a third 2θ angle (A3) value (on the x axis), greater than the first 2θ angle (A1) value, at which the (018) diffraction peak has a second intensity (I$_{10\%}^2$) that is equal to 10% of the maximal intensity (I$_{MAX}$), i.e. I$_{10\%}^2$=0.1 I$_{MAX}$.

The homogenous distribution of elemental aluminum leads to an improved crystal-structural stability at a high voltage, as demonstrated in Table 2 wherein it is shown that the specific floating capacity decreases as A$_{D(018)}$=1.00 is approached. The A$_{D(018)}$ is therefore an indicator of the stability of the claimed LCO cathode active material powder at high voltage (i.e. at voltages of at least 4.5V).

The cathode active material powder comprises particles having an Al to (Co+Al+M'+Me) molar ratio (x) less than or equal to 0.050 so as to minimize a capacity loss, and greater than or equal to 0.002 so as to stabilize a crystal-structure of the LCO cathode active material powder during cycling.

The cathode active material powder comprises particles having a Li to (Co+Al+M'+Me) molar ratio (1+a) greater than or equal to 0.99 and less than or equal to 1.01, preferably greater than or equal to 0.995 and less than or equal to 1.005.

If the ratio 1+a is less than 0.99 (a<−0.01), a Co dissolution at a higher voltage such as 4.50V occurs since there is not enough Li to hold the cobalt atoms in the structure of the cathode active material particles and the capacity of the cathode active material powder decreases. If the ratio 1+a is more than 1.01 (a>0.01), the cycle life of the cathode active material powder deteriorates.

In the framework of the present invention, the D50 is the volumetric median particle size and is greater than or equal to 20.00 μm, preferably 25.00 μm, and less than or equal to 45.00 μm. Preferably, the cathode active material powder according to the present invention has a D50 greater than or equal to 30.00 μm and less than or equal to 40.00 μm.

Due a larger D50 of the LCO cathode active material powder according to the invention, in comparison with conventional D50 values (less than 20.00 μm) for this type of cathode active material, the claimed LCO cathode active material powder shows packing density values which are much higher than the conventional ones. The D50 should however be less than 45.00 μm, because surface scratching of the cathode during its preparation from the LCO cathode active material powder is observed for D50 values higher than this upper limit.

In the framework of the present invention, the averaged circularity of particles is greater than or equal to 0.85 and less than or equal to 1.00.

The present invention concerns the following embodiments:

Embodiment 1

In a first aspect, the present invention concerns a lithium cobalt-based oxide cathode active material powder, which comprises particles having a median particle size D50 of greater than or equal to 25.00 μm and less than or equal to 45.00 μm, said particles having an averaged circularity of greater than or equal to 0.85 and less than or equal to 1.00, said particles having a general formula $Li_{1+a}Co_{1-x-y-z}Al_xM'_yMe_zO_2$, wherein M' and Me comprise at least one element of the group consisting of: Ni, Mn, Nb, Ti, W, Zr, and Mg, with $-0.01 \leq a \leq 0.01$, $0.002 \leq x \leq 0.050$, $0 \leq y \leq 0.020$ and $0 \leq z \leq 0.050$, said lithium cobalt-based oxide particles having a R-3m structure and (018) diffraction peak asymmetry factor $A_{D(018)}$ of greater than or equal to 0.85 and less than or equal to 1.15, said diffraction peak asymmetry factor being obtained by a synchrotron XRD spectrum analysis with a λ value equal to 0.825 Å.

Preferably, the cathode active material powder has an $A_{D(018)}$ factor greater than or equal to 0.85 and of at most 1.00.

Preferably, lithium cobalt-based oxide cathode active material powder comprises particles having an averaged circularity of greater than or equal to 0.90 and less than or equal to 1.00, preferably of greater than or equal to 0.95 and less than or equal to 1.00, more preferably of greater than or equal to 0.85 and less than or equal to 0.95, most preferably of greater than or equal to 0.90 and less than or equal to 0.95.

Optionally, the lithium cobalt-based oxide cathode active material powder comprises particles having a median particle size D50 of greater than or equal to 35.00 μm and less than or equal to 45.00 μm.

The lithium cobalt-based oxide cathode active material powder may comprise particles having a median particle size D50 of greater than or equal to 35.00 μm and less than or equal to 40.00 μm.

More preferably, y and z=0.

The D50 is a volumetric-based value (see section 1.1 below) expressed in μm+/−0.01 μm.

The averaged circularity is a number-based value (see section 1.7 below).

Embodiment 2

Preferably, the cathode active material powder of the Embodiment 1 has a press density greater than or equal to 3.95 g/cm³ and less than or equal to 4.40 g/cm³.

Embodiment 3

More preferably, the cathode active material powder according to the Embodiment 1 or 2 has a volumetric capacity of at least 570 mAh/cm³, preferably of at most 700 mAh/cm³, and a specific floating capacity of at most 80 mAh/g.

Embodiment 4

In a fourth Embodiment, the present invention is also inclusive of a process for manufacturing the cathode active material powder according to the invention.

The process according to the invention comprises the steps of:
Preparing a first cathode active material powder having a general formula $Li_{1+a'}Co_{1-x'-y'}Al_{x'}M'_{y'}O_2$, M' being at least one element of the group consisting of: Ni, Mn, Nb, Ti, W, Zr, and Mg, with $0.03 \leq a' \leq 0.10$, $0.002 \leq x' \leq 0.050$, and $y' \leq 0.02$, and comprising particles having a D50 of greater than or equal to 20.00 μm, preferably 25.00 μm, and less than or equal to 45.00 μm, said particles having an averaged circularity of greater than or equal to 0.85 and less than or equal to 1.00,
mixing the first cathode active material powder with a first Co-bearing precursor and optionally, with a source of Me, to prepare a first mixture, wherein the Li to (Co+Al+M') or the Li to (Co+Al+M'+Me) molar ratio in said mixture is greater than or equal to 0.99 and less than or equal to 1.01,
sintering said first mixture at a temperature of greater than or equal to 800° C. and less than or equal to 1100° C., so as to obtain a first sintered agglomerated powder and milling and screening said first sintered agglomerated powder so as to obtain a second cathode active material powder according to the Embodiment 1.

Preferably, the first cathode active material powder comprises particles having an averaged circularity of greater than or equal to 0.90 and less than or equal to 1.00, preferably of greater than or equal to 0.95 and less than or equal to 1.00, more preferably of greater than or equal to 0.85 and less than or equal to 0.95, most preferably of greater than or equal to 0.90 and less than or equal to 0.95.

Optionally, the first cathode active material powder comprises particles having a median particle size D50 of greater than or equal to 35.00 μm and less than or equal to 45.00 μm.

Preferably, the first Co-bearing precursor has a D50 less than 10.00 μm, more preferably less than 5.00 μm to maximize the volumetric density of the second cathode active material according to the Embodiment 1 and referred to as LCO2 hereafter.

More preferably, the first mixture is sintered at a temperature greater than or equal to 800° C. during a period greater than or equal to an hour in an oxygen containing atmosphere, such as air.

In the present invention, it is observed that the control of the Li to (Co+Al+M') molar ratio (1+a') in range between 1.03 to 1.10 allows to achieve the claimed D50 range of values of the LCO2 particles.

Embodiment 5

In a fifth Embodiment according to the Embodiment 4, the step of preparing the first cathode active material powder (referred to as LCO1 hereafter) is a solid-state reaction comprising the steps of:
preparing a second mixture comprising: a Li source, a second Co-bearing precursor, optionally a M' source, and an Al source, said second mixture having a Li to (Co+Al+M') molar ratio greater than or equal to 1.03 and less than or equal to 1.10, or
preparing a third mixture of: a Li source, a second Co, Al-bearing, and optionally M'-bearing, precursor, said third mixture having a Li to (Co+Al+M') molar ratio greater than or equal to 1.03 and less than or equal to 1.10,
sintering said second or said third mixture at a temperature of greater than or equal to 950° C. and less than or equal to 1100° C., during a period of at least 5 hours in an oxygen containing atmosphere such as air, so as to obtain a second sintered agglomerated powder and
milling and screening the second sintered agglomerated powder so as to obtain the first cathode active material powder according to Embodiment 4.

Li sources can be either one or more of $Li_2O$, LiOH, $LiOH.H_2O$, $Li_2CO_3$, and $LiNO_3$.

Co-bearing precursors can be either one or more of $CoO_2$, $CoCO_3$, CoO(OH), and $Co(OH)_2$.

Optionally, the Co-bearing precursor contains Al and M'.

Preferably, the second Co-bearing precursor has a D50 greater than or equal to 20.00 μm, preferably 25.00 μm, and less than or equal to 45.00 μm.

If the D50 of the second Co-bearing precursor is less than 20.00 μm, it is required to increase the Li to (Co+Al+M') molar ratio of the second mixture or to sinter said second mixture at a temperature greater than 1100° C.

In the process of the invention, the second Co-bearing precursor has a D50 substantially equal to the D50 of the first cathode material powder. The D50 of the first cathode material powder is substantially equal to the D50 of the lithium cobalt oxide cathode active material powder according to Embodiments 1 to 3.

DETAILED DESCRIPTION

The invention is further illustrated in the following examples:
1. Description of Analysis Methods
1.1. Particle Size Distribution The D50 is an indicator of a powder particle size distribution (hereafter referred to as psd) and is obtained by a laser psd measurement method. In this invention, the laser PSD is measured by using a Malvern Mastersizer 2000 with Hydro 2000MU wet dispersion accessory, e.g. after having dispersed the powder in an aqueous medium. In order to improve the dispersion of the powder in the aqueous medium, sufficient ultrasonic irradiation and stirring are applied and an appropriate surfactant is introduced in the aqueous medium.

If the powder according to the invention has a multimodal psd profile, then said multimodal profile is deconvoluted, then if one or several deconvoluted modes having a D50 comprised in the 25.00 μm and 45.00 μm range are identified, said powder has a D50 according to claim 1.

If the powder according to the present invention has a monomodal psd profile with a single mode having a D50 comprised in the in the 20.00 μm, preferably 25.00 μm, and 45.00 μm range, said powder has therefore a D50 according to claim 1.

1.2. Pressed Density

The pressed density (PD) is measured according to the following procedure: 3 grams of a LCO cathode active material powder is filled into a pellet die with a diameter "d" of 1.3 cm. A pressure of 207 MPa is applied for 30 seconds. After relaxing the load, the thickness "t" of the pressed LCO cathode active material powder is measured. The pressed density PD is 3 g divided by the volume of the pressed powder ($\pi \times (d/2)^2 \times t$).

1.3. Inductively Coupled Plasma

The inductively coupled plasma (ICP) method is used to measure the content of elements such as Li, Co, and Al by using an Agilent ICP 720-ES device.

2 g of a powder sample is dissolved in 10 mL high purity hydrochloric acid in an Erlenmeyer flask. The flask is covered by a glass and heated on a hot plate until complete dissolution of the precursor is achieved. After being cooled to the room temperature, the solution is moved to a 100 mL volumetric flask. After having filled the flask with the solution, the volumetric flask is filled with deionized water up to the 100 mL mark. 5 mL of the resulting solution is transferred into a 50 mL volumetric flask for a $2^{nd}$ dilution, where the volumetric flask is filled with 10% hydrochloric acid up to the 50 mL mark and then homogenized. Finally, this 50 mL solution is used in the ICP measurement.

1.4. High Angular Resolution Synchrotron x-Ray Diffraction

High angular resolution synchrotron powder x-ray diffraction (SXRD) is carried out on the BL04-MSPD beamline of the ALBA synchrotron (Cerdanyola del Vallès, Spain). All powders were packed in 0.5 mm diameter capillaries. The typical 2θ angular range was from 0° to 70° with 0.006° angular step and 3 minutes accumulation time. The patterns were recorded in a Debye-Scherrer geometry with a wavelength of λ=0.825 Å+/−0.010 Å.

Inorganic Crystal Structure Database (ICSD, provided by FIZ Karlsruhe and the U.S. Secretary of Commerce) contains information on all inorganic crystal-structures published since 1913. peak positions in the obtained diffraction pattern and the elements in a powder sample (e.g. Li, Co, O, Al) are searched in the ICSD so as to determine a crystal-structure of a power sample.

1.5. Peak Asymmetry Factor

A peak asymmetry factor $A_{D(018)}$ is obtained from SXRD data (cfr. section 1.4) and according to the following procedure: A peak located at a 2θ diffraction angle of 33.7°±0.2° corresponds to the (018) direction of the R-3m structure.

The base line (background) of the peak (the base line extending from 33.50° to) 33.85° is subtracted by a base line function in Origin 9.1 software with a straight line method.

Figure 1:
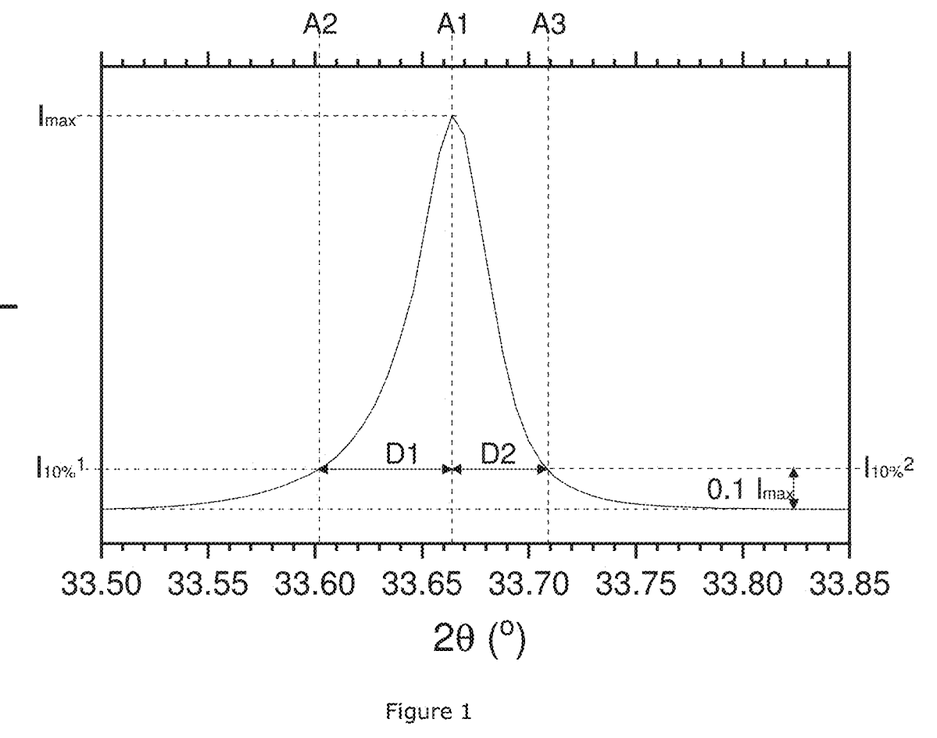
FIG. 1: (018) diffraction peak of CEX2A having a R-3m structure after subtracting a base line, obtained by a synchrotron XRD spectrum analysis with a λ value equal to 0.825 Å (x axis: 2θ (°) and y axis: intensity I).
Figure 2:
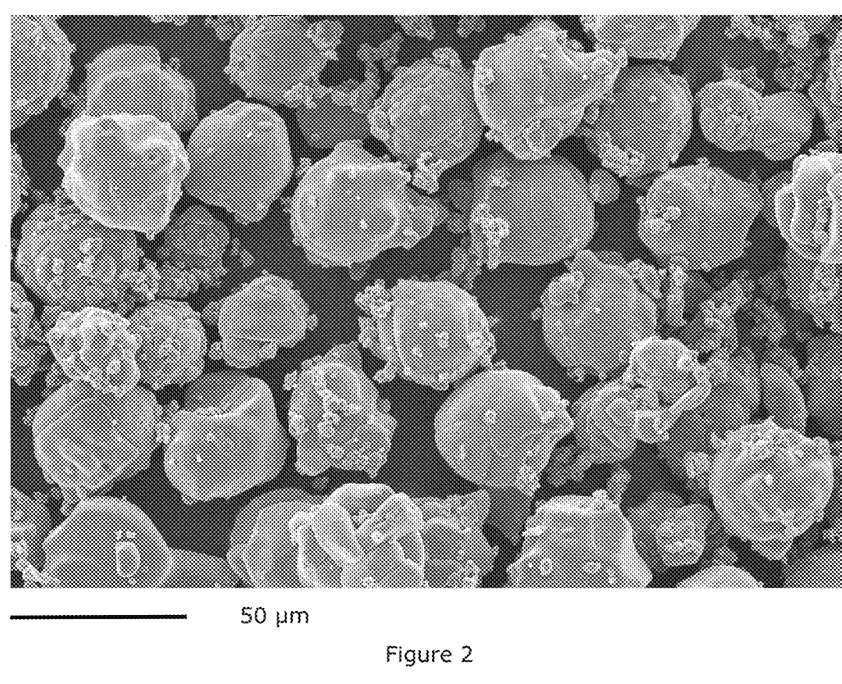
FIG. 2: Morphology of EX1.

FIG. 1 shows a (018) diffraction peak related to the CEX2A (R-3m) cathode active material powder, after having subtracted a base line. This spectrum has been obtained by a synchrotron XRD according to the analysis method described in the section 1.4.

$A_{D(018)}$ corresponds to a D2/D1 ratio, wherein:
1) D1 is a first 2θ angle difference (expressed in °) between:
   i) a first 2θ angle (A1=33.664°) value (on the x axis) at which the (018) diffraction peak has its maximum intensity ($I_{MAX}$), and
   ii) a second 2θ angle (A2=33.601°) value (on the x axis), less than the first 2θ angle (A1) value, at which the (018) diffraction peak has a first intensity ($I_{10\%}^{1}$) that is equal to 10% of the maximal intensity ($I_{MAX}$).
2) D2 is a second 2θ angle difference (expressed in °) between:
   i) the first 2θ angle (A1) value, and
   ii) a third 2θ angle (A3=33.709°) value (on the x axis), greater than the first 2θ angle (A1) value, at which the (018) diffraction peak has a second intensity ($I_{10\%}^{2}$) that is equal to 10% of the maximal intensity ($I_{MAX}$).

In CEX2A, D2/D1=0.045/0.063=0.72.

1.6. Electrochemical Analysis: Capacity and a Floating Test Analysis 1.6.1. Coin Cells Preparation Coin cells that are used in a discharge capacity and floating test analysis are assembled according to the following steps:

Step 1) Preparation of a Cathode:

A slurry that contains the solids: a LCO cathode active material powder, a conductor (Super P, Timcal) and a binder (KF #9305, Kureha) in a weight ratio 90:5:5, and a solvent (NMP, Sigma-Aldrich) are mixed in a high speed homogenizer so as to obtain a homogenized slurry. The homogenized slurry is spread on one side of an aluminum foil using a doctor blade coater with a 230 μm gap. the slurry-coated aluminum foil is dried in an oven at 120° C., then pressed using a calendaring tool, and dried again in a vacuum oven to remove the solvent completely.

Step 2) Coin Cell Assembly:

A coin cell is assembled in a glovebox which is filled with an inert gas (argon). For the discharge capacity analysis, a separator (Celgard) is located between the cathode and a piece of lithium foil used as an anode. For the floating test, two pieces of separator are located between the cathode and an anode, which consists of graphite. 1M $LiPF_6$ in EC:DMC (1:2 in volume) is used as electrolyte and dropped between separator and electrodes. Then, the coin cell is completely sealed to prevent leakage of electrolyte.

1.6.2. Discharge Capacity Analysis

The first charge and discharge capacity (CQ1 and DQ1) are measured by constant current mode with 0.1C rate, where 1C is defined as 160 mAh/g and charge cutoff voltage is 4.30V and discharge cutoff voltage is 3.0V. The volumetric discharge capacity DQ1V (mAh/cm³) is obtained according to multiplying DQ1 by PD.

1.6.3. Floating Test Analysis

The floating test analyses the crystal-stability of LCO compounds at a high voltage at an elevated temperature.

The prepared coin cell is tested according to the following charge protocol: the coin cell is first charged to 4.5V at constant current mode with C/20 rate (1C=160 mAh/g) in a 50° C. chamber. The coin cell is then kept at constant voltage (4.5V) for 5 days (120 hours), which is a very severe condition.

Once side reactions or metal dissolution happen, there will be a voltage drop. The electrochemical instrument will automatically compensate the (loss of) current to keep the voltage constant. Therefore, the recorded current is a measure of the ongoing side reactions during cycling.

The specific floating capacity (QF) is the total amount capacity (mAh/g) during the floating test. After the floating test, the coin cell is disassembled. The anode and the separator (localized close to the anode) are analyzed by ICP for a metal dissolution analysis. The measured cobalt content is normalized by the total amount of active material in the electrode so that a specific cobalt dissolution value ($Co_{Dis}$) is obtained.

1.7. Morphology Analysis

The morphology of a powder sample is analyzed with a Scanning Electron Microscopy (SEM) technique. The measurement is performed with a JEOL JSM-6000. An image of the powder sample is recorded with a magnification of 500 times to demonstrate the averaged circularity of the powder sample particles. In the SEM image, ten particles are selected and the circularity of these particles is calculated as follows:

$$\text{Circularity} = 4\pi \frac{A}{P^2}$$

wherein A is an area of a particle, P is a perimeter of a particle, these parameters being obtained using an ImageJ software (reference is made to the Sections 30.2 to 30.7— "Set measurement" of the Image J User Guide version IJ 1.46r).

The averaged circularity according to the invention may be expressed as follows:

$$\text{Averaged circularity} = \frac{\left(\sum_{i=1}^{n} 4\pi \frac{A_i}{P_i^2}\right)}{n},$$

wherein n is the number of particles i analyzed according to the below-provided protocol. The averaged circularity is then a number-based average value.

A sufficient number of particles is at least 10 for a SEM image recorded with a magnification of 500 times. The at least 10 particles have a size of at least 20.00 μm.

As mentioned above, the calculation of the circularity implies the measurement of:
i) The perimeter which is effected by: a) determining an outside boundary of the SEM image of a particle, by b) decomposing the outside boundary into individual segment-based selections, each of these selections having an individual perimeter, and by c) adding the values of the lengths of the individual perimeters so as to obtain the value of the perimeter of a particle; and
ii) The area which is done by: adding a plurality of pixel areas included in a surface defined by the outside boundary.

An averaged circularity of 1.00 means that the particles representative of a sample have a spherical shape.

An averaged circularity less than 1.00 means that the particles representative of a sample have a non-spherical shape.

An averaged circularity greater than 0 and less than 1 refers to an ellipsoidal shape. The invention is further illustrated in the following examples:

2. EXAMPLES AND COMPARATIVE EXAMPLES

Example 1

A $CoCO_3$ powder having a D50 of 38.00 µm and an $Al_2O_3$ powder are mixed so as to obtain a mixture having an Al to (Co+Al) molar ratio of 0.04 and the mixture is heated at 600° C. for 3 hours under a flow of air to prepare an Al coated Co oxide "CAO1". The CAO1 powder and $Li_2CO_3$ are mixed so as to obtain a mixture having a Li to (Co+Al) molar ratio of 1.04 and the mixture is heated at 1000° C. for 10 hours under a flow of air. The sintered powder is grinded and named LCO1A-EX1 having a general formula of $Li_{1.04}Co_{0.96}Al_{0.04}O_2$ and a D50 of 37.00 µm.

LCO1B-EX1, which is prepared by a same procedure as LCO1A-EX1 except that the Li to (Co+Al) molar ratio is 1.06, has a general formula of $Li_{1.06}Co_{0.96}Al_{0.04}O_2$ and a D50 of 39.00 µm.

A $Co_3O_4$ powder having a D50 of 3.00 µm and $Al_2O_3$ powder are mixed so as to obtain a mixture having an Al to (Co+Al) molar ratio of 0.04, and the mixture is heated at 1000° C. for 10 hours under a flow of air to prepare an Al coated Co oxide "CAO2".

LCO1A-EX1 and CAO2 are mixed to prepare EX1A having a general formula $Li_{1.00}Co_{0.96}Al_{0.04}O_2$. The mixture is heated at 980° C. for an hour under a flow of air. The sintered powder is grinded and named EX1A.

EX1B is prepared by a same procedure as EX1A except that LCO1B-EX1 is used instead of LCO1A-EX1.

EX1A and EX1B are according to the present invention.

Comparative Example 1

CAO2 and $Li_2CO_3$ are mixed so as to obtain a mixture having an Al to (Co+Al) molar ratio of 1.00, and the mixture is heated at 1000° C. for 10 hours under a flow of air. The sintered powder is grinded and named LCO1A-CEX1 which has a general formula $Li_{1.00}Co_{0.96}Al_{0.04}O_2$ and a D50 of 4.00 µm.

LCO1B-CEX1, LCO1C-CEX1, and LCO1D-CEX1 are prepared by a same procedure as LCO1A-CEX1 except that the Li to (Co+Al) molar ratios in the mixture are 1.02, 1.04, and 1.06, respectively. The general formulas of LCO1B-CEX1, LCO1C-CEX1, and LCO1D-CEX1 are $Li_{1.02}Co_{0.96}Al_{0.04}O_2$, $Li_{1.04}Co_{0.96}Al_{0.04}O_2$, and $Li_{1.06}Co_{0.96}Al_{0.04}O_2$, respectively. The D50 of LCO1B-CEX1, LCO1C-CEX1, and LCO1D-CEX1 are 8.00 µm, 15.00 µm, 20.00 µm, respectively.

LCO1A-CEX1 is heated at 980° C. for an hour under a flow of air. The sintered powder is grinded and named CEX1A which has a general formula $Li_{1.00}Co_{0.96}Al_{0.04}O_2$.

LCO1B-CEX1 and CAO2 are mixed so as to obtain a mixture having Li to (Co+Al) molar ratio of 1.00. The mixture is heated at 980° C. for an hour under a flow of air. The sintered powder is grinded and named CEX1B having a general formula $Li_{1.00}Co_{0.96}Al_{0.04}O_2$.

CEX1C and CEX1D are prepared by a same procedure as CEX1B except that LCO1C-CEX1 and LCO1D-CEX1 are used instead of LCO1B-CEX1.

CEX1A, CEX1B, CEX1C, and CEX1D are not according to the present invention.

Comparative Example 2

CAO2 and $Li_2CO_3$ are mixed so as to obtain a mixture having a Li to (Co+Al) molar ratio of 0.99 and the mixture is heated at 980° C. for 10 hours under a flow of air. The sintered powder is grinded and named CEX2A having a general formula $Li_{0.99}Co_{0.96}Al_{0.04}O_2$.

A $Co_3O_4$ powder having around 3.00 µm and $Al_2O_3$ powder are mixed so as to obtain a mixture having an Al to (Co+Al) molar ratio of 0.04 and named CAO3. CAO3 and $Li_2CO_3$ are mixed so as to obtain a mixture having a Li to (Co+Al) of 0.99 and the mixture is heated at 980° C. for 10 hours under a flow of air. The sintered powder is grinded and named CEX2B having a general formula $Li_{0.99}Co_{0.96}Al_{0.04}O_2$.

CEX2A and CEX2B are not according to the present invention.

3. Discussion

Table 1 shows the key preparation conditions of the LCO cathode active material powders according to Example 1 and Comparative example 1. EX1A and EX1B are prepared by the two sintering steps according to the method claimed in the present invention. The methods to prepare CEX1A and CEX1B are not according to the present invention because neither the D50 of Co precursor of LCO1 is greater than 20.00 µm nor the ratio 1+a' is greater than or equal to 1.03. The methods to prepare CEX1C and CEX1D are also not according to the present invention because the D50 of LCO1 is not greater than 20.00 µm.

Table 2 shows analytical results, obtained according to the analysis method described in the section 1.2. Pellet density, 1.6.2. discharge capacity analysis, 1.6.3. floating test analysis, and 1.4. high angular resolution synchrotron XRD (SXRD), of LCO compounds in Example 1, Comparative example 1, and Comparative example 2.

DQ1V corresponds the volumetric capacity of batteries. The parameters QF and $Co_{Dis}$ are obtained by the floating test (cfr. section 1.6.3) and are indicators of the crystal-structural stability at a high voltage such as 4.50V or higher. QF and $Co_{Dis}$ should be as low as possible.

EX1A and EX1B have lower QF and $Co_{Dis}$ as well as higher DQ1V.

CEX2A and CEX2B are prepared by a single sintering step. It shows that the uniform distribution of elemental aluminum cannot be achieved by a single sintering step.

TABLE 1

| | Formula of LCO1 and D50 of Co precursor or LCO1 | | | | |
| --- | --- | --- | --- | --- | --- |
| Example ID | LCO1 ID | Formula of LCO1 | D50 of Co precursor of LCO1 (µm) | Crystal structure | Averaged circularity |
| EX1A | LCO1A-EX1 | $Li_{1.04}Co_{0.96}Al_{0.04}O_2$ | 38.00 | R-3m | 0.87 |
| EX1B | LCO1B-EX1 | $Li_{1.06}Co_{0.96}Al_{0.04}O_2$ | 38.00 | R-3m | 0.91 |
| CEX1A | LCO1A-CEX1 | $Li_{1.00}Co_{0.96}Al_{0.04}O_2$ | 3.00 | R-3m | 0.68 |

TABLE 1-continued

Formula of LCO1 and D50 of Co precursor or LCO1

| Example ID | LCO1 ID | Formula of LCO1 | D50 of Co precursor of LCO1 (μm) | Crystal structure | Averaged circularity |
|---|---|---|---|---|---|
| CEX1B | LCO1B-CEX1 | $Li_{1.02}Co_{0.96}Al_{0.04}O_2$ | 3.00 | R-3m | 0.77 |
| CEX1C | LCO1C-CEX1 | $Li_{1.04}Co_{0.96}Al_{0.04}O_2$ | 3.00 | R-3m | 0.83 |
| CEX1D | LCO1D-CEX1 | $Li_{1.06}Co_{0.96}Al_{0.04}O_2$ | 3.00 | R-3m | 0.81 |

TABLE 2

Analytical results

| Example ID | Related to the invention | psd D50 (μm) | SXRD D1 (°) | SXRD D2 (°) | $A_{D(018)}$ | PD (g/cm³) | DQ1V (mAh/cm³) | QF (mAh/g) | $Co_{Dis}$ (mg/g) |
|---|---|---|---|---|---|---|---|---|---|
| EX1A | Yes | 38.00 | 0.040 | 0.035 | 0.88 | 4.0 | 584.0 | 76 | 9 |
| EX1B | Yes | 40.00 | 0.035 | 0.033 | 0.93 | 4.1 | 583.2 | 73 | 10 |
| CEX1A | No | 5.00 | 0.066 | 0.045 | 0.68 | 3.3 | 508.2 | 169 | 28 |
| CEX1B | No | 9.00 | 0.040 | 0.034 | 0.84 | 3.4 | 518.8 | 99 | 14 |
| CEX1C | No | 16.00 | 0.028 | 0.029 | 1.06 | 3.6 | 542.7 | 70 | 9 |
| CEX1D | No | 21.00 | 0.031 | 0.030 | 0.97 | 3.7 | 552.0 | 69 | 8 |
| CEX2A | No | 5.00 | 0.063 | 0.045 | 0.72 | 3.3 | 503.2 | — | — |
| CEX2B | No | 5.00 | 0.072 | 0.054 | 0.74 | 3.3 | 513.4 | — | — |

The present invention is covered by the following clauses:
1. A lithium cobalt-based oxide cathode active material powder comprising particles having a median particle size D50 of greater than or equal to 20.00 μm, preferably 25.00 μm, and less than or equal to 45.00 μm, said particles having an averaged circularity of greater than or equal to 0.85 and less than or equal to 1.00, said particles having a general formula $Li_{1+a}Co_{1-x-y-z}Al_xM'_yMe_zO_2$, wherein M' and Me comprise at least one element of the group consisting of: Ni, Mn, Nb, Ti, W, Zr, and Mg, with $-0.01 \leq a \leq 0.01$, $0.002 \leq x \leq 0.050$, $0 \leq y \leq 0.020$ and $0 \leq z \leq 0.050$, said lithium cobalt-based oxide particles having a R-3m structure and (018) diffraction peak asymmetry factor $A_{D(018)}$ of greater than or equal to 0.85 and less than or equal to 1.15, said diffraction peak asymmetry factor being obtained by a synchrotron XRD spectrum analysis with an emission wavelength A value equal to 0.825 Å.
2. The lithium cobalt-based oxide cathode active material powder according to clause 1, having an averaged circularity of greater than or equal to 0.90 and less than or equal to 1.00.
3. The lithium cobalt-based oxide cathode active material powder according to clause 1 or 2, having a press density greater than or equal to 3.95 g/cm³ and less than or equal to 4.40 g/cm³.
4. The lithium cobalt-based oxide cathode active material powder according to any of the preceding clauses, having a volumetric capacity of at least 570 mAh/cm³, preferably of at most 700 mAh/cm³, and a specific floating capacity of at most 80 mAh/g.
5. The lithium cobalt-based oxide cathode active material powder according to any of the preceding clauses, having an $A_{D(018)}$ factor greater than or equal to 0.85 and of at most 1.00.
6. The lithium cobalt-based oxide cathode active material powder according to any of the preceding clauses, wherein y and z=0.
7. A process for manufacturing the cathode active material powder according to any of the preceding clauses, comprising the steps of:
Preparing a first cathode active material powder having a general formula $Li_{1+a'}Co_{1-x'-y'}Al_{x'}M'_{y'}O_2$, M' being at least one element of the group consisting of: Ni, Mn, Nb, Ti, W, Zr, and Mg, with $0.03 \leq a' \leq 0.10$, $0.002 \leq x' \leq 0.050$, and $y' \leq 0.02$, and comprising particles having a D50 of greater than or equal to 20.00 μm, preferably 25.00 μm, and less than or equal to 45.00 μm, said particles having an averaged circularity of greater than or equal to 0.85 and less than or equal to 1.00,
mixing the first cathode active material powder with a first Co-bearing precursor and optionally, with a source of Me, to prepare a first mixture, wherein the Li to (Co+Al+M') or the Li to (Co+Al+M'+Me) molar ratio in said mixture is greater than or equal to 0.99 and less than or equal to 1.01,
sintering said first mixture at a temperature of greater than or equal to 800° C. and less than or equal to 1100° C., so as to obtain a first sintered agglomerated powder and milling and screening said first sintered agglomerated powder so as to obtain the cathode active material powder according to any of the preceding claims.
8. A process according to clause 7, said process comprising the steps of:

preparing a second mixture comprising: a Li source, a second Co-bearing precursor, optionally a M' source, and an Al source, said second mixture having a Li to (Co+Al+M') molar ratio greater than or equal to 1.03 and less than or equal to 1.10, or preparing a third mixture of: a Li source, a second Co, Al-bearing, and optionally M'-bearing, precursor, said third mixture having a Li to (Co+Al+M') molar ratio greater than or equal to 1.03 and less than or equal to 1.10, sintering said second or said third mixture at a temperature of greater than or equal to 950° C. and less than or equal to 1100° C., during a period of at least 5 hours in an oxygen containing atmosphere such as air, so as to obtain a second sintered agglomerated powder and milling and screening the second sintered agglomerated powder so as to obtain the first cathode active material powder having a D50 of greater than or equal to 20.00 μm, preferably 25.00 μm, and less than or equal to 45.00 μm and an averaged circularity of greater than or equal to 0.85 and less than or equal to 1.00.

9. The process according to clause 7, wherein the second Co-bearing precursor has a D50 greater than or equal to 20.00 μm and less than or equal to 45.00 μm.

10. A lithium-ion secondary battery comprising the lithium cobalt-based oxide cathode active material powder according to any of the preceding clauses.

11. Use of the lithium-ion secondary battery according to the clause 10 in an electronic device such a smartphone, or a portable computer.

The invention claimed is:

1. A lithium cobalt-based oxide cathode active material powder comprising particles having a median particle size D50 of greater than or equal to 20.00 μm and less than or equal to 45.00m, said particles having an averaged circularity of greater than or equal to 0.85 and less than or equal to 1.00, said particles having a general formula $Li_{1-a}Co_{1-x-y-z}Al_xM'_yMe_zO_2$, wherein M' and Me comprise at least one element of the group consisting of: Ni, Mn, Nb, Ti, W, Zr, and Mg, with $-0.01 \le a \le 0.01$, $0.002 \le x \le 0.050$, $0 \le y \le 0.020$ and $0 \le z \le 0.050$, said lithium cobalt-based oxide particles having a R-3m structure and (018) diffraction peak asymmetry factor $A_{D(018)}$ of greater than or equal to 0.85 and less than or equal to 1.15, said diffraction peak asymmetry factor being obtained by a synchrotron XRD spectrum analysis with an emission wavelength λ value equal to 0.825 Å.

2. The lithium cobalt-based oxide cathode active material powder according to claim 1, having an averaged circularity of greater than or equal to 0.90 and less than or equal to 1.00.

3. The lithium cobalt-based oxide cathode active material powder according to claim 1, having a press density greater than or equal to 3.95 g/cm$^3$ and less than or equal to 4.40 g/cm$^3$.

4. The lithium cobalt-based oxide cathode active material powder according to claim 1, having a volumetric capacity of at least 570 mAh/cm$^3$ and a specific floating capacity of at most 80 mAh/g.

5. The lithium cobalt-based oxide cathode active material powder according to claim 4, having a volumetric capacity of at least 570 mAh/cm$^3$ and of at most 700 mAh/cm$^3$.

6. The lithium cobalt-based oxide cathode active material powder according to claim 1, having an $A_{D(018)}$ factor greater than or equal to 0.85 and of at most 1.00.

7. The lithium cobalt-based oxide cathode active material powder according to claim 1, wherein y and z=0.

8. The lithium cobalt-based oxide cathode active material powder of claim 1, comprising particles having a median particle size D50 of greater than or equal to 25.00m.

9. A lithium-ion secondary battery comprising the lithium cobalt-based oxide cathode active material powder according to claim 1.

10. An electronic device comprising the lithium-ion secondary battery according to claim 9.

11. A process for manufacturing the cathode active material powder according to claim 1, comprising the steps of:

preparing a first cathode active material powder having a general formula $Li_{1+a'}Co_{1-x'-y'}Al_{x'}M'_{y'}O_2$, M' being at least one element of the group consisting of: Ni, Mn, Nb, Ti, W, Zr, and Mg, with $0.03 \le a' \le 0.10$, $0.002 \le x' \le 0.050$, and $y' \le 0.02$, mixing the first cathode active material powder with a first Co-bearing precursor and optionally, with a source of Me, to prepare a first mixture, wherein the Li to (Co+Al+M') or the Li to (Co+Al+M'+Me) molar ratio in said mixture is greater than or equal to 0.99 and less than or equal to 1.01, and sintering said first mixture at a temperature of greater than or equal to 800° C. and less than or equal to 1100° C., so as to obtain a first sintered agglomerated powder and milling and screening said first sintered agglomerated powder so as to obtain the cathode active material powder according to claim 1.

12. A process according to claim 11, said process comprising the steps of:

preparing a second mixture comprising: a Li source, a second Co-bearing precursor, optionally a M' source, and an Al source, said second mixture having a Li to (Co+Al+M') molar ratio greater than or equal to 1.03 and less than or equal to 1.10, or preparing a third mixture of: a Li source, a second Co, Al-bearing, and optionally M'-bearing, precursor, said third mixture having a Li to (Co+Al+M') molar ratio greater than or equal to 1.03 and less than or equal to 1.10, sintering said second or said third mixture at a temperature of greater than or equal to 950° C. and less than or equal to 1100° C., during a period of at least 5 hours in an oxygen containing atmosphere such as air, so as to obtain a second sintered agglomerated powder, and milling and screening the second sintered agglomerated powder so as to obtain the first cathode active material powder.

13. A process according to claim 12, wherein the oxygen containing atmosphere for sintering said second or said third mixture is air.

14. The process according to claim 12, wherein the second Co-bearing precursor has a D50 greater than or equal to 20.00m and less than or equal to 45.00m.

* * * * *